Aug. 27, 1929.  V. S. HENRY ET AL  1,726,511
APPARATUS AND METHOD FOR TREATING FINELY DIVIDED SOLIDS
Original Filed June 8, 1923  2 Sheets-Sheet 1
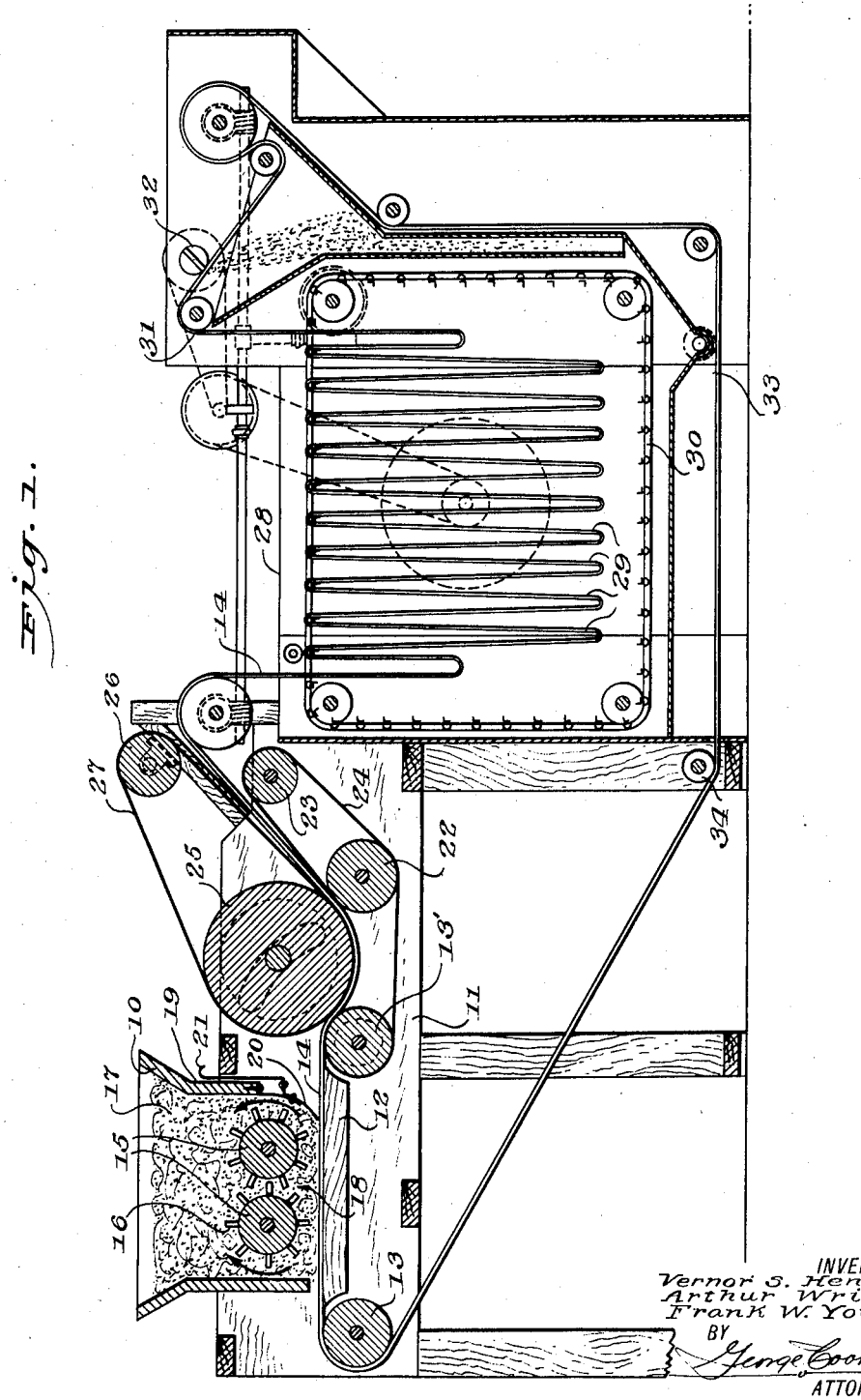
INVENTORS
Vernor S. Henry
Arthur Wright
Frank W. Young
BY
George Cook + ?
ATTORNEYS

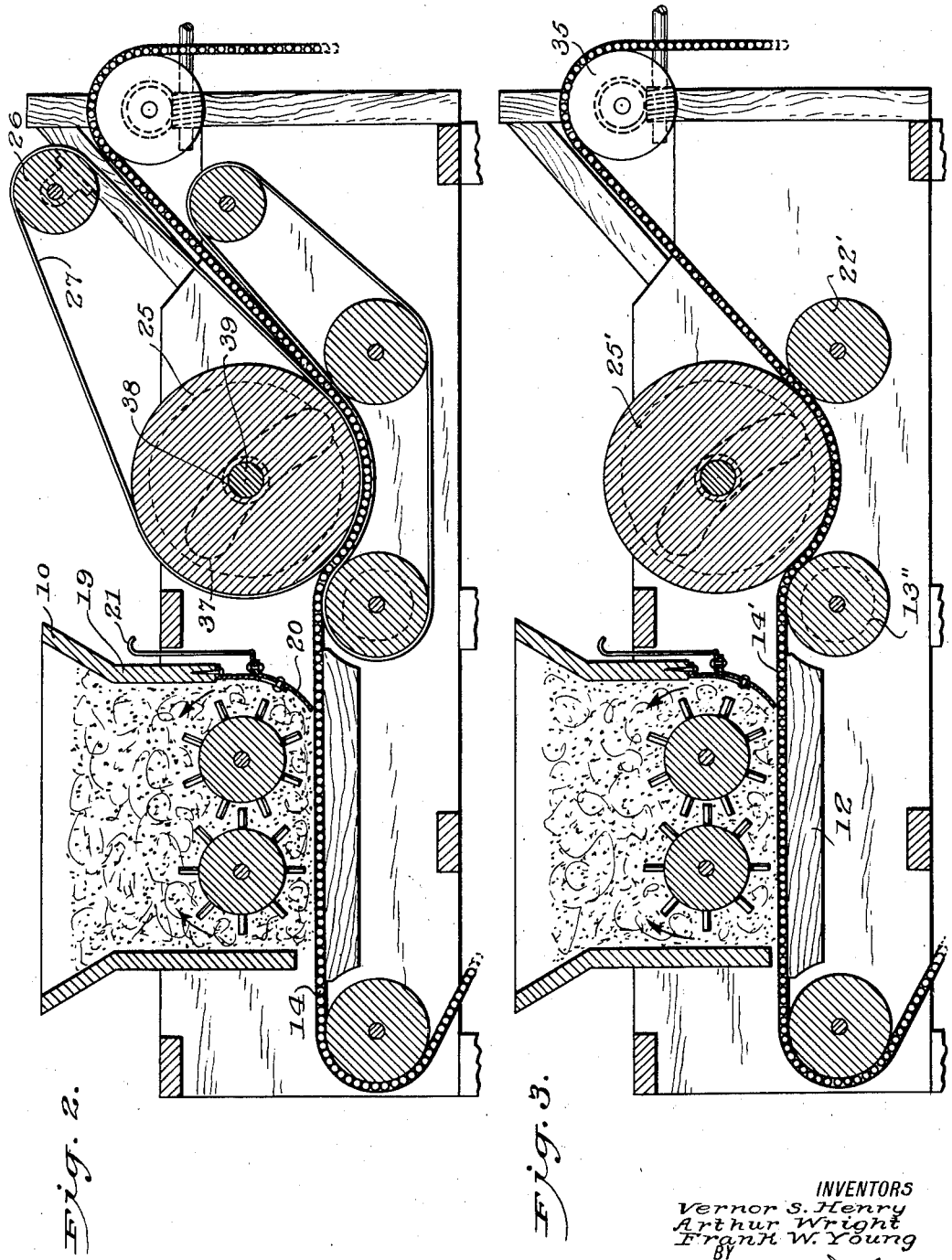

Patented Aug. 27, 1929.

1,726,511

UNITED STATES PATENT OFFICE.

VERNOR S. HENRY, OF SUMMIT, ARTHUR WRIGHT, OF UPPER MONTCLAIR, AND FRANK W. YOUNG, OF VERONA, NEW JERSEY, ASSIGNORS TO FILTRATION ENGINEERS, INC., OF NEW YORK, N. Y., A CORPORATION OF NEW YORK.

APPARATUS AND METHOD FOR TREATING FINELY-DIVIDED SOLIDS.

Application filed June 8, 1923, Serial No. 644,284. Renewed December 7, 1927.

Our invention relates to a method and apparatus for conveying, drying, or in other ways handling finely divided, moist or pasty solids.

More specifically, our invention contemplates a novel method and apparatus for impregnating a conveyor belt with wet solids, cakes or slurries. It also seeks to efficiently and effectually regulate the quantity of material contained in or carried by the conveyor belt. Furthermore our invention seeks to provide for the efficient drying or in other ways treating the material carried by the belt.

A further object is to provide an improved apparatus for not only regulating the quantity of material contained in or deposited upon the conveyor belt but to further provide efficient means for squeezing the excess moisture from such material and forming a cake upon or in the belt which cake will remain attached to the belt and thus allow it to be transported through dryers or other material treating apparatus and be subsequently removed from the belt after such transferral and treatment.

With the foregoing and other objects in view, our invention consists in the improved method and apparatus for conveying and treating finely divided, moist solids or slurries and similar material, illustrated in the accompanying drawings and hereinafter described and claimed, and in such variations and modifications thereof as will be obvious to those skilled in the art to which our invention relates, it being understood that changes may be made within the scope of what is claimed without departing from the spirit thereof.

In the drawings:

Figure 1 is a view in side elevation and partially in section of an apparatus embodying the characteristic features of our invention;

Figure 2 is an enlarged view of the same; and

Figure 3 is an enlarged view of a somewhat modified form of our apparatus.

Referring specifically to the several views, wherein similar reference numerals designate corresponding parts throughout, our improved apparatus comprises a hopper 10 mounted upon a suitable stand 11 and directly below the open end of which hopper is a platform 12. Two rollers 13—13' are located at each end of the platform and across which rollers extends the conveyor belt 14, the same resting upon the table 12 and passing directly beneath the open lower end of the hopper 10.

Contained within the hopper 10 is a pair of rollers 15, each provided with a series of arms or paddles 16 thereon, so arranged that as the rollers are turned in the direction as indicated by the arrows, the semi-solid or moist solid material 17 which is contained within the hopper will be forced down at 18 upon and into the interstices and meshes of the conveyor belt 14. The rear wall 19 of the hopper is cut away and a door 20 mounted thereinplace and arranged to slide so as to approach or recede from the conveyor belt 14, there being a suitable handle 21 whereby the position of the sliding door may be controlled. The door 20 acts in the nature of a scraper or valve and limits or determines the quantity of material fed from the hopper upon, and into, the conveyor belt.

We have thus disclosed one means for embedding a conveyor belt as a reenforcement within a cake of solid material but it is to be understood that the invention in its broadest aspects is not limited to the means shown but is broadly directed to the forcing of wet or moist finely divided material into the interstices of a conveyor belt whereby the reenforced material may be subsequently handled and treated.

Mounted adjacent the rear roller 13' is a third roller 22, and in conjunction with which there operates a fourth roller 23 spaced above and away from the rollers 13'—22. A compressor belt 24, preferably of canvas or other similar nature, extends around the rollers 13', 22 and 23, and receives the conveyor belt 14 thereagainst and may serve as a support for the reenforced material. There is shown a large compression roller 25 arranged above and intermediate the rollers 13' and 22 to compress the reenforced material against the support, say the belt 24 and/or rollers 13'—and/or 22 so that the conveyor belt is caused to travel down around an arc which extends below the line tangent to the upper surfaces of the rollers 13'—22. This depressed portion of the conveyor belt 14 causes a corresponding depression within the belt 24 so that the two are brought into intimate contact and thereby provide for the ironing and compressing of the wet or moist solids and insuring their subsequent conveyal and drying or other desired treatment. We have also found it advisable to provide an additional roller 26 located above and beyond the roller 25 and which two rollers carry a second compressing or ironing belt 27, the belts 24 and 27 extending along the path of the conveyor belt so as to remain in intimate contact with the same for some considerable distance and thus compress and iron the material or solids upon or within the conveyor belt 14.

In order to illustrate one method of drying the material upon the conveyor belt we have shown what is known as a festoon dryer 28 and into which the conveyor belt 14 passes and is formed into loops or festoons 29 which are gradually moved through the dryer by the endless chain 30. The conveyor belt 14 subsequently passes out of the festoon dryer as at 31 and beneath an agitating or beating roller 32 so as to completely dislodge the dry material therefrom. The conveyor belt then passes beneath the drying chamber as at 33 and, passing over suitable rollers 34, again returns to the initial roller 13 which is arranged at the front of the hopper 10.

An enlarged view of the hopper feeding portion is illustrated in Figure 2 and particular attention is called to the belt 14 which, as therein illustrated, is preferably composed of spiral wire, so that after the material has become properly impregnated therein it may be readily transported, dried, or in other ways treated, and then dislodged therefrom. Furthermore, particular attention is called to the slide gate or door 20, which through the manipulation of the handle 21 allows the quantity of material which is conveyed away from the hopper by the belt conveyor, to be regulated.

In the modified form of apparatus illustrated in Figure 3, the ironing belts are omitted and the spiral conveyor belt 14', after passing over the rear roller 13'', passes beneath the large roller 25', over the second small roller 22', and thence up and around a guide roller 35 and from which point it passes into a dryer or other treating apparatus, according to the nature of the material being handled. The rollers 13' and/or 13'' and 25' may be hollow, as illustrated, so as to be heated either by steam or other suitable agent, and thus with some materials materially aid in the prevention of the moist solids carried with the conveyor belt 14' adhering to the rollers. The position of the roller 25 of Figures 1 and 2 and 25' of Figure 3 is made adjustable by providing a suitable arc-shaped slot 37 in the side walls of the stand and providing suitable means 38 whereby the supporting shafts 39 of the rollers may be locked in desired and adjusted position, thus varying the degree of compression with which the material is forced into the conveyor or reenforcing belt.

From the foregoing it will be apparent that we are able to deliver finely divided moist solids into the hopper 10 and the same will, by the rollers or agitators, be forced into the conveying belt and transferred or conveyed to any desired point, such as into a suitable dryer or other treating apparatus. Further, the compressing of the wet solids into a belt or ribbon-like form permits of their rapid and efficient drying. The hopper 10 may be placed directly beneath the scraper from a filter press, so that the entire handling of the filter cake will be automatic and continuous, thus providing for the very efficient drying and treating of filter cake and other similar materials.

Having thus described and explained our invention, we claim and desire to secure by Letters Patent:—

1. An apparatus of the class described comprising a hopper, a travelling belt passing therebeneath, means for forcing the material from said hopper down, upon and into said conveyor belt, means for receiving said conveyor belt therein and adapted to treat the material upon said conveyor belt, and means for removing the treated material from said conveyor belt.

2. An apparatus of the class described comprising a hopper, a conveyor belt associated therewith, means for forcing the material from said hopper upon said conveyor belt to cause it to adhere thereto, the rollers receiving said conveyor belt thereon and adapted to iron and compress the cake of material received from said hopper, a drying oven receiving said conveyor belt therein, and means for removing the dried material from said conveyor belt.

3. An apparatus of the class described comprising an endless conveyor belt, means for driving the same, a hopper located in proximity to one portion of the conveyor belt and adapted to force material down upon the same, suitable rollers located beyond said hopper and adapted to force the material upon said conveyor belt into intimate contact and association with the same, ironing belts adapted to further compress the material into said conveyor belt, and an apparatus receiving a portion of the conveyor belt therein and adapted to treat the material contained thereon, and means for removing the treated material from said conveyor belt.

4. The method of conveying material which comprises forcing the material into the meshes or interstices of or upon a moving conveyor element, thereafter moving the conveyor element between suitable compressor elements the surfaces of which that are opposed to said element are moved with said element and thereby compressing the material engaging said element, conducting said element and the material thereon to a desired point, and disengaging the material from said element.

5. An apparatus of the class described comprising a foraminous conveyor belt, means for forcing into said belt material to be conveyed, compressors adapted to compress the material on said belt, means for supporting and moving said belt, and means for removing the material from said belt.

6. An apparatus of the class described comprising a foraminous conveyor belt, means for forcing into said belt material to be conveyed, compressors adapted to compress the material on said belt and comprising members acting upon opposite sides of said belt, means for supporting and moving said belt, and means for removing the material from said belt.

7. The method of handling finely divided solids comprising forcing moist, finely divided material into the meshes of a moving, endless conveyor belt, compresisng the material into the belt, leading the conveyor belt into a material treating apparatus and then removing the treated material from the belt.

8. The method of handling finely divided solids comprising forcing moist, finely divided material into the meshes of a moving, endless conveyor belt, then leading the belt between compressing rollers, leading the conveyor belt into a material treating apparatus and then removing the treated material from the belt.

9. The method of handling finely divided solids comprising forcing moist, finely divided material into the meshes of a moving, endless conveyor belt, then leading the conveyor belt into contact with a compressing and ironing belt, leading said conveyor into a material treating apparatus and then removing the treated material from the belt.

10. The method of handling finely divided solids comprising forcing moist, finely divided material into the meshes of a moving, endless conveyor belt, then leading the conveyor belt into contact with a compressing roll and a compressing and ironing belt, leading the conveyor belt into a material treating apparatus and removing the treated material from the belt.

11. The method of handling finely divided solids comprising delivering moist finely divided material into the meshes of a moving endless mesh conveyor belt, then leading the belt between compressing rollers and compressing and ironing belts, leading the conveyor belt into a material drying apparatus and then removing the material from the belt.

12. The method of handling finely divided solids comprising forcing moist, finely divided material into the meshes of a moving, endless conveyor belt, then leading the belt between heated compressing rollers, leading the conveyor belt into a material treated apparatus and then removing the treated material from the belt.

13. The method of handling finely divided solids comprising forcing moist, finely divided material into the meshes of a moving, endless conveyor belt, then leading the conveyor belt into contact with a heated compressing roll and a compressing and ironing belt, leading the conveyor belt into a material treating apparatus and removing the treated material from the belt.

14. The method of handling finely divided solids comprising forcing moist finely divided material into the meshes of a moving, endless conveyor belt, simultaneously heating and compressing the material into the belt, leading the conveyor belt into a material treating apparatus and then removing the treated material from the belt.

15. The method of treating finely divided solids comprising delivering moist finely divided material into the meshes of a moving conveyor belt, then leading the belt into contact with a heated roller and then leading the belt into a treating chamber.

16. Apparatus of the class described comprising a reinforcement, means for causing the adherence of material to said reinforcement, a movable heated compressing element about which the reinforcement is directed and means for removing the material from said reinforcement.

17. An apparatus for treating finely divided solids comprising a perforated conveyor, means to cause the adherence of material to the conveyor, a rotary heated compressing element with which the conveyor contacts and means for removing the material from said conveyor.

18. An apparatus for treating finely divided material comprising an endless mesh belt conveyor, positive means to cause the deposit of material within the interstices of the belt a treating cylinder with which the belt contacts, a heating chamber and means to discharge the material from the belt.

19. Apparatus for handling finely divided material comprising in combination, a mesh belt having interstices, means to deliver material thereto, means to force the material into the interstices of the belt, and means to compress the material while in the interstices of the belt.

20. Apparatus for handling finely divided material comprising in combination, a mesh belt having interstices, means to deliver material thereto, means to force the material into the interstices of the belt, and a roller to compress the material while in the interstices of the belt.

21. Apparatus for handling finely divided material comprising in combination, a mesh belt having interstices, means to deliver material thereto, means for force the material into the interstices of the belt, and rollers between which the belt pass to compress the material while in the interstices of the belt.

22. An apparatus of the character described comprising a hopper adapted to receive moist finely divided solids, a platform beneath the open end of the hopper, a conveyor belt formed with interstices adapted to travel between the platform and the open end of the hopper and receive the moist finely divided solids, and rotating means within the hopper to force said solids into the interstices of the conveyor belt.

23. An apparatus of the character described comprising a hopper adapted to receive moist finely divided solids, a surface beneath the open end of the hopper, a conveyor belt formed with interstices adapted to travel between the surface and the open end of the hopper and receive the moist finely divided solids, and means within the hopper to force said solids into the interstices of the conveyor belt.

24. An apparatus of the character described comprising a hopper adapted to receive moist finely divided solids, a platform beneath the open end of the hopper, a conveyor belt formed with interstices adapted to travel between the platform and the open end of the hopper and receive the moist finely divided solids, means within the hopper to force said solids into the interstices of the conveyor belt and a scraper to determine the quantity of solids carried by the conveyor belt.

25. An apparatus of the character described comprising a hopper adapted to receive moist finely divided solids, a platform beneath the open end of the hopper, a mesh conveyor belt formed with interstices adapted to travel between the platform and the open end of the hopper and receive the moist finely divided solids and means to determine the quantity of solids fed into the conveyor belt.

26. An apparatus of the character described comprising a hopper adapted to receive moist finely divided solids, a platform beneath the open end of the hopper, a conveyor belt formed with interstices adapted to travel between the platform and the open end of the hopper and receive the moist finely divided solids, rotating means within the hopper to force said solids into the interstices of the conveyor belt and a scraper cooperating with the conveyor belt at a point in its travel after the solids have been fed thereinto.

27. An apparatus of the character described comprising a hopper adapted to receive moist finely divided solids, a platform beneath the open end of the hopper, a conveyor belt formed with interstices adapted to travel between the platform and the open end of the hopper and receive the moist finely divided solids, means within the hopper to force said solids into the interstices of the conveyor belt and scrapers cooperating with both surfaces of the conveyor belt to determine the quantity of solids carried by the conveyor belt.

28. An apparatus of the class described comprising a hopper, a conveyor belt passing therebeneath, means for forcing the material from the hopper into said conveyor belt, means for receiving said conveyor belt therein and adapted to treat the material carried with the conveyor belt, and means for removing the treated material from said conveyor belt.

29. An apparatus of the class described comprising a hopper, a conveyor belt passing therebeneath, means for forcing the material into said conveyor belt, scraping means to limit the quantity of material carried by the belt, means for receiving said conveyor belt therein and adapted to treat the material carried with the conveyor belt, and means for removing the treated material from said conveyor belt.

30. An apparatus of the class described comprising a hopper having an open end and adapted to receive filter cake from a filter, a platform beneath the open end of the hopper, a continuous conveyor belt formed with interstices adapted to travel between the platform and the open end of the hopper and receive the filter cake, a roller within the hopper to force the filter cake into the conveyor belt, a scraper to determine the quantity of filter cake upon the conveyor belt, a roller with which the conveyor belt contacts, a dryer, an endless chain in the dryer to support the conveyor belt in festoons and convey said festoons through the dryer, and a beater to dislodge the dry material from the conveyor belt.

31. An apparatus of the class described comprising a hopper having an open end and adapted to receive filter cake from a filter, a platform beneath the open end of the hopper, a continuous conveyor belt formed with interstices adapted to travel between the platform and the open end of the hopper and receive the filter cake, a roller within the hopper to force the filter cake into the conveyor belt, a scraper to determine the quantity of filter cake upon the conveyor belt, a heated roller with which the conveyor belt contacts, a dryer, an endless chain in the dryer to support the conveyor belt in festoons and convey said festoons through the dryer, and a beater to dislodge the dry material from the conveyor belt.

32. An apparatus of the class described comprising a hopper having an open end and adapted to receive filter cake from a filter, a platform beneath the open end of the hopper, a continuous conveyor belt formed with interstices adapted to travel between the platform and the open end of the hopper and receive the filter cake, means to force the filter cake into the conveyor belt, a dryer and an endless chain in the dryer to support the conveyor belt in festoons and convey said festoons through the dryer.

33. An apparatus of the class described comprising a hopper having an open end and adapted to receive filter cake from a filter, a platform beneath the open end of the hopper, a continuous conveyor belt formed with interstices adapted to travel between the platform and the open end of the hopper and receive the filter cake, a roller within the hopper to force the filter cake into the conveyor belt, a scraper to determine the quantity of filter cake upon the conveyor belt, a heated roller with which the conveyor belt contacts, a dryer and an endless chain in the dryer to support the conveyor belt in festoons and convey said festoons through the dryer, and means to dislodge the dry material from the conveyor belt.

Signed at New York, county of New York and State of New York, this 22 day of May, 1923.

VERNOR S. HENRY.

Signed at New York, county of New York and State of New York, this 4 day of June, 1923.

ARTHUR WRIGHT.

Signed at New York, county of New York and State of New York, this 22 day of May, 1923.

FRANK W. YOUNG.